May 29, 1962 — W. GRUBER — 3,036,621

TIRE PATCH

Filed Nov. 9, 1959 — 2 Sheets-Sheet 1

INVENTOR.
W. Gruber
BY
ATTYS

May 29, 1962     W. GRUBER     3,036,621
TIRE PATCH
Filed Nov. 9, 1959                           2 Sheets-Sheet 2
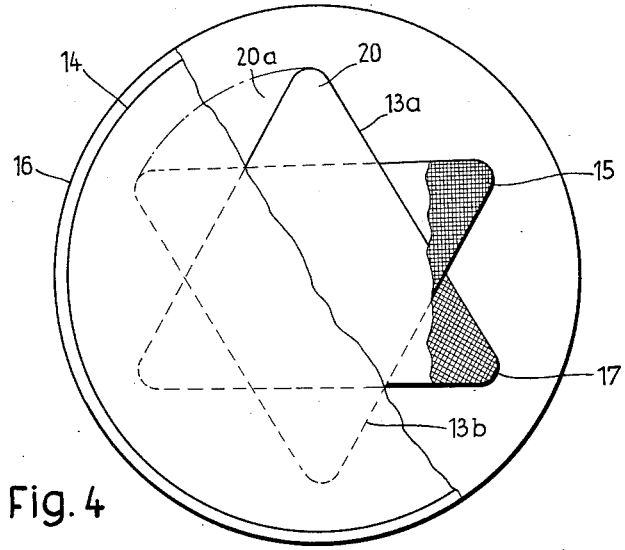
Fig. 4
Fig. 5
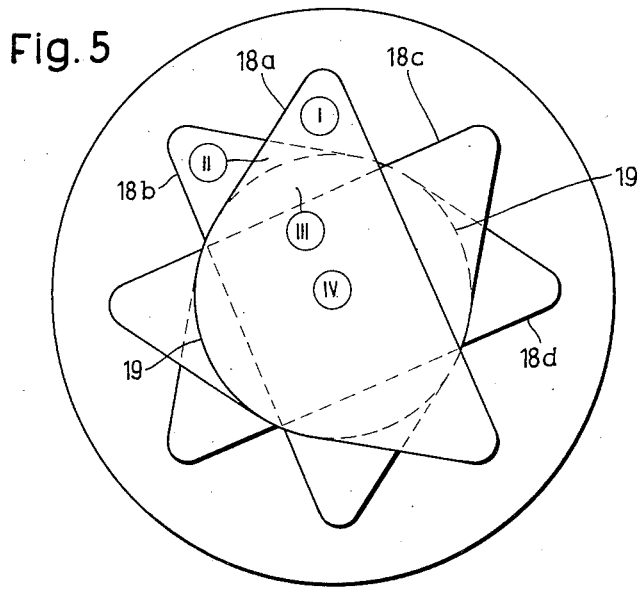
INVENTOR.
W. Gruber
ATTYS United States Patent Office 3,036,621
Patented May 29, 1962

3,036,621
TIRE PATCH
Wilhelm Gruber, Munich, Germany, assignor to Stahlgruber Otto Gruber & Co., Munich, Germany, a firm of Germany
Filed Nov. 9, 1959, Ser. No. 851,613
Claims priority, application Germany Nov. 14, 1958
16 Claims. (Cl. 152—367)

The present invention relates broadly to improvements in repair members for repairing rubber or rubberized articles.

More particularly this invention relates to improvements in patches for repairing tears or punctures in automobile tires.

Accordingly, it is a particular object of the present invention to provide a tire patch that is reduced in size, weight and thickness and more flexible than those known in the art and which will adequately adhere to the tire at its peripheral edges and which further has a high bursting strength and a high tearing strength.

The production of the patch according to the invention is based upon a proper recognition of the fact that a thin, light, solid, but sufficiently elastic tire patch which does not come loose when in use can be attained only by an appropriate selection of the most suitable outer shape, construction, and material of such a patch and the most suitable coordination of these features with each other. In designing such a tire patch, the present invention purposely disregards the previous requirement which was always considered absolutely essential, namely, that the structure of the patch should comply as much as possible to that of the carcass of the tire also insofar as the type of material is concerned.

The present invention therefore concerns the design and production of a tire patch with superimposed reinforcing inserts, the free ends of which are rounded off considerably and are superimposed upon and placed at such an angle to each other as to form a rosette-shaped patch body in which the reinforcing inserts consist of a rubberized fabric of a thickness of 0.3 to 0.8 mm., the tensile strength of which in the warp and weft directions corresponds to the tensile loads which are to be expected in various directions when the repaired tire is used on the road.

These and other important objects, features, and advantages of the present invention will become further apparent from the following detailed description thereof, particularly when the same is read with reference to the accompanying drawings, in which—

FIGURE 4 shows a bottom view, partly in cross section, of a tire patch according to another modification of the invention;

FIGURE 5 shows a further modification somewhat similar to the embodiment according to FIGURE 4;

FIGURE 6 shows a plan view of a very simple form of a tire patch according to the invention which is especially adapted for the recapping of tires; while

Figure 1:
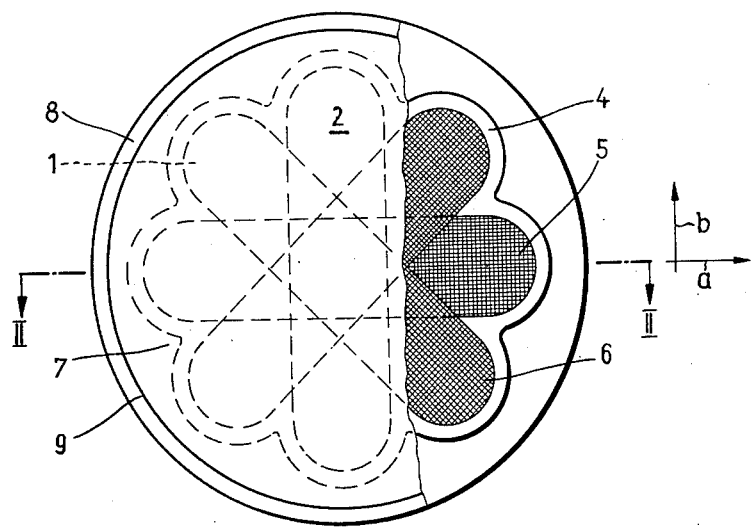
FIGURE 1 shows a bottom view, partly in cross section, of a tire patch according to the invention.
Figure 2:
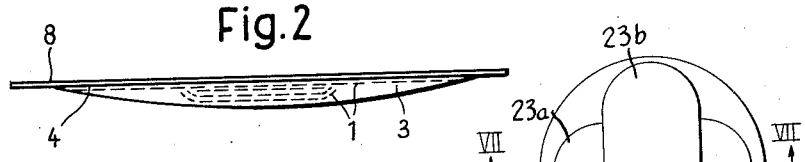
FIGURE 2 shows a cross section as taken along line II—II of FIGURE 1.

Referring first to FIGURES 1 and 2 of the drawings, the tire patch according to the invention consists of tongue-shaped reinforcing inserts or members denoted generally at 1 of a particular type of rubberized fabric as subsequently described. These inserts are combined to form a rosette-like shape, as generally indicated at 2.

This rosette is embedded in rubber 3 so that even in the marginal areas the individual inserts will be fully enveloped therein. This rubber coating or envelope may also be of a shape 4 in accordance with but of greater outer dimensions than that of the rosette 2. Furthermore, it may consist of unvulcanized, partly vulcanized, or fully vulcanized rubber depending upon its subsequent purpose and manner of application.

In the embodiment of the invention as illustrated in FIGURES 1 and 2, four relatively narrow reinforcing fabric layers 5 are provided in which, insofar as the solidity of the fabric in the warp direction $a$ and the weft direction $b$ is concerned, the tensile stresses are taken into consideration which are to be expected in actual use. Thus, for example, the tensile strength of the fabric used may be the same in the warp and weft directions or it may be slightly greater in one direction than in the other.

The outer ends 6 of the reinforcing layers 5 are, according to the invention, well rounded. They form the rosette shape of the body of the patch, and due to the rounding, the solidity of the patch gradually decreases in the direction toward the marginal zone, while the degree of elasticity increases which counteracts any tendency of the patch to come loose. The area 7 between the curved ends of the rosette is filled out with unvulcanized or vulcanized rubber to such an extent that the outer edge 9 of the patch body is still spaced at a certain distance from the ends of the reinforcing layers. Prevulcanized patches are preferably also provided with an adhesive connecting layer 8 which extends beyond the outer periphery of the patch body so as to produce a solid connection between the patch body and the repaired article.

According to the invention, the reinforcing layers are made very thin so that the tire patch will also be very thin and light, and they may be provided with upper and lower rubber coatings of a relatively great thickness which, after the patch is installed, compensate the occurring tensions. The novel application of a real fabric with a tensile strength both in the warp and weft directions in accordance with the stresses to be expected in the use of the patch and the repaired tire provides the patch in all directions with a solidity and stability which is fully adequate to resist all possible loads and stresses and to relieve the repair mechanic of the previous responsibility of applying the patch in a very particular prescribed direction which in many cases could hardly even be determined. By means of the inventive combination of the reinforcements made of a fabric in the form of a rosette with elastic rubber filling out the space between the adjacent curved ends of the rosette, which is either prevulcanized or vulcanized when the patch is finally applied to the defective tire, it is possible to attain the proper relation between the required solidity and elasticity which should gradually vary from the center toward the edge of the patch in such a manner that the solidity decreases, while the elasticity increases. Due to the connection between the fabric inserts in their longitudinal and transverse directions, the tensile and tangential stresses occurring at every change in the direction of the load will be distributed to and taken up by the entire fabric body and not merely, as in the known tire patches, by individual threads or solely by the rubber which fills out the space between the threads. At the occurrence of tangential stresses, the required elasticity will be maintained and the reinforcing inserts will not tear in at the edges since the fabric threads extending in this tangential direction will take up and distribute these stresses, whereas such tearing between the individual threads is unavoidable if the reinforcing layers consist of tire cord.

If the tire patches are to be used for repairing very large defects, for example, in truck tires, they should be provided with reinforcing inserts of a greater strength. However, since thick fabrics would produce considerable steps at the edges and in the adjacent rubber, the invention further provides that the individual reinforcing inserts be built up of two or more thin fabric layers which are superimposed upon each other, and in which the next layer is always slightly narrower than the one underneath. This is illustrated in FIGURE 3, in which the rosette-shaped covering layer 10 consists of rubber and the reinforcing inserts 11 and 12 consist of two superimposed layers of rubberized fabric, the upper layer 12 of which is narrower than the lower layer 11.

Figure 3:
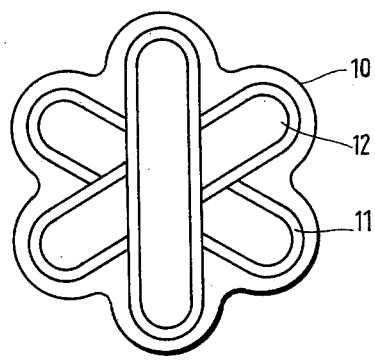
FIGURE 3 shows a plan view of parts of a tire patch according to a modification of the invention.

While the body of the tire patch according to FIGURES 1 to 3 consists of narrow strip-shaped inserts, the modification of the invention according to FIGURE 4 shows a tire patch which consists of two triangular inserts 13a and 13b which are embedded in a layer of rubber 14. Inserts 13a and 13b consist of a suitable fabric 15, and the corners 17 thereof are rounded off considerably. If the patch is prevulcanized, it should also be provided with a so-called connecting layer 16.

Another modification of the tire patch according to the invention, similar in principle to that shown in FIGURE 4, is illustrated in FIGURE 5, in which the covering layer which encloses the reinforcing inserts has been omitted to facilitate the illustration. The body of the tire patch according to FIGURE 5 consists of four substantially triangular inserts 18a to 18d, in which, however, one tip 19 of each triangle is rounded off to such an extent that the overlapping inserts together form a circular reinforced center. The solidity of this tire patch reduces more or less gradually from the center toward the edges, while its elasticity increases accordingly since the number of superimposed layers decreases from the middle toward the outside, as indicated by the encircled numerals IV to I. Such a tire patch has been proved to have the proper solidity and elasticity to stand up even under the roughest driving conditions.

Such an elasticity of the tire patch is also very desirable so as to enable the patch to follow the expanding and contracting movements of the tire while the same bends back and forth when running along a road. It is especially desirable in a tubeless tire which is provided with an elastic sealing insert, for example, of butyl rubber.

As indicated in FIGURE 4, it is also advisable in view of the desired solidity and elasticity of the patch to make the areas 20a between the tongues 20, which in the finished patch are filled with rubber, of a proper proportion to the size of the areas of the patch which substantially consist of fabric. This is of importance since the patch when in use should be sufficiently solid and also very elastic so that, without danger of loosening, it can sustain the distortions to which especially the edges of the patch are subjected when the tire bends back and forth and its material is stretched and contracted while running on the road. The area 20a between tongues 20 is therefore preferably made of a size as indicated in FIGURE 4 by the arcuate dot-and-dash line which is substantially equal to the size of the area which is taken up by the adjacent tongue projections.

Another object of the present invention is to provide a tire patch of such an elasticity that it will insure a solid closure of the defective place of the tire and will fill out the tear or puncture completely, and will also not come loose from the tire under the continuous working of the material to which the repaired place of the tire is subjected. It should in this connection be realized that in this continuous working of the comparatively elastic rubber of a tire patch, the reinforcing inserts actually constitute a foreign body therein. On the other hand, for bridging the tear or puncture in the carcass of the tire with sufficient solidity, the tire patch should not be too elastic and its degree of elasticity should be confined within certain limits. In actual practice it is very difficult to coordinate the various requirements derived from the above considerations since the modulus of elasticity will be shifted upwardly or downwardly beyond the desired limits because of the heat which necessarily develops in the tire while running on the road, and especially also because of the vulcanizing temperature to which tire patches are subjected which are applied by hot-vulcanization.

The present applicant realized that a very safe and reliable tire patch may only be attained if the reinforcing inserts are made of a fabric of a very definite elasticity. According to the invention it has been found that a very suitable fabric of this kind is one made of synthetic fibers in which the elasticity of the fibers is reduced and preset to a definite value by a suitable heat treatment. A fabric which has proved to be particularly suitable is one which is woven of threads which are prestretched while heated, and which is additionally thermoset as a finished fabric at a temperature of 150 to 180° C. By such a treatment it is possible to limit the elasticity of the fabric to a certain suitable value so that, at a later installation of the tire patch by means of hot vulcanization or during its use in a tire on the road, no changes will occur in its elasticity and also no shrinkage or reduction in its solidity.

Figure 6:
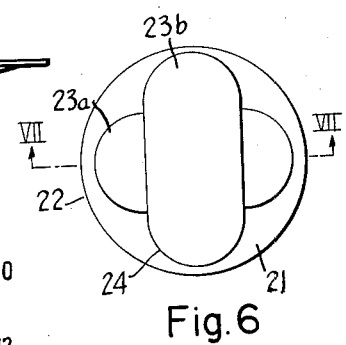
Figure 7:
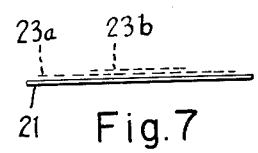
FIGURE 7 shows a cross section taken along line VII—VII of FIGURE 6.

Although the tire patches according to the invention are primarily intended to be applied to the inside of defective tires, they may also be applied to the outside of partly damaged tire carcasses when retreading or recapping the same. Thus, they may also be used in a process in which, after the largest part of the old tread has been removed from the carcass, a new unvulcanized tread is applied and pressed thereon and thereafter shaped in a heated mold and fully vulcanized. In such a process, the tread of the tire is usually removed from the carcass except for a residue of 2 to 3 mm. which is then roughened and provided with a heated solution. The recapping patch according to the invention, as illustrated in FIGURES 6 and 7, is then applied between the worked-off carcass and the new unvulcanized tread and is thereafter vulcanized together with the latter. This recapping patch consists of a cushioning disk 21 of unvulcanized rubber of a thickness of about 0.6 to 1.2 mm. and an outer contour 22 of a shape in accordance with the place to be repaired but preferably round, and of at least two thin reinforcing layers 23a and 23b of a thickness of about 0.5 mm. which are applied upon disk 21 and consist of a fabric according to the invention. If the reinforcing layers 23a and 23b are covered on both sides with cushioning disks 21, these disks are preferably made thinner, that is, of a thickness of about 0.4 to 0.6 mm. Naturally, for repairing larger defects, the patches may be of a larger size and may then have more than two reinforcing layers. They may then have a shape similar to FIGURE 1 and be superimposed at an angle to each other and placed upon or between disks 21. Also in this case, the reinforcing layers should be considerably rounded so as to compensate the tensions which occur in driving and are caused by the strong continuously changing expansions and contractions of the material of the tire and patch.

A proper repair of a defective place on a tire, for example, a puncture, also requires that the reinforced center of the tire patch be applied exactly at the center of the defect. In order to facilitate such an application, the invention further provides a suitable marking, for example, a colored dot or spot at the center of the reinforced part. Another feature of the invention consists in making this colored dot, spot, or other marking of a size which also forms an indication of the maximum size of the defect which may be repaired with the respective tire patch.

A large number of tests with conventional tire patches of prior design have shown that the rayon cord used therein has in one direction a tensile strength of only 30 kg. per 2 sq. cm., and that the nylon cord which has also been used for this purpose has a tensile strength of 64 kg.

The cord layers thus tested even had a thickness of 1.2 mm. The thermoset fabric of the reinforcing layers according to the invention, which is a real fabric and considerably thinner than the previous cord layers of tire patches, has, however, a tensile strength of 165 kg., and not merely in one direction, but in two directions extending at right angles to each other. This also explains why a tire patch according to the invention which is composed of eight reinforcing layers has a thickness of only 2.2 mm. while the conventional tire patches which are composed of eight layers of tire cord have a thickness of 10 to 12 mm.

In actual practice, not only the tensile strength of a tire patch, but also its bursting strength is of a great importance. The tests with the known nylon cord layers, two of which were superimposed so as to cross each other, showed that their bursting pressure amounted to only 7.5 atm., while a layer of the fabric according to the invention did not even show any change when subjected to a pressure of 30 atm.

Since the tire patches according to the present invention are very light and flexible, it is also possible to apply much smaller patches than previously required for repairing punctures and other defects of a given size. The lighter patches according to the invention also need a smaller adhesive surface than the previous patches, which is an additional reason why smaller patches may now be used than were previously required for repairing a defect of a certain size. Aside from this advantage, there is the important fact resulting from the present invention that the surroundings of the repaired defective place, that is, those outside of the central part of the intersection of the reinforcing strips, will be thickened much less than by the previous tire patches. Furthermore, because of the high flexibility of the patch according to the invention, the tire need hardly be spread out in order to apply the patch. The application of the patch as well as the selection of its proper size is also considering facilitated by the marking at the reinforced center of the patch, which is preferably provided on the body of the patch as well as on the protective foil.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a tire patch, a plurality of superimposed, reinforcing members each having rounded end portions, rubber material fully embedding said reinforcing members, said members being arranged in overlapping relation so that the end portions are at an angle to each other to define in plan a reinforcing body of rosette-like shape, said body having a central area including overlapping portions of a plurality of the members and which central area is large in comparison to the radial extent of each member, said body further having a peripheral area including the end portions of the individual members, the projecting extent of said end portions outwards of the central area being smaller than the transverse extent of said central area, each member consisting of rubberized fabric having a thickness of between 0.3 to 0.8 mm. whereby said central area is thin, and each member including warp and weft strands of thermosettable fiber woven at a temperature of at least approximately 150° C. so that each member has a tensile strength both in the warp and weft directions of the fabric capable of absorbing tensile stresses exerted either radially or tangentially of the patch when the same is in use in a tire.

2. A tire patch as defined in claim 1, in which each of said reinforcing members which together define said rosette-like body is of a substantially triangular shape.

3. A tire patch as defined in claim 2, in which one of the corners of each of said triangular members is rounded off to such an extent that the rounded corners of said plurality of superimposed angularly displaced members define a substantially circular reinforced center area of said rosette-like body.

4. A tire patch as defined in claim 1, in which said superimposed reinforcing members are covered on one side by a cushioning disk of unvulcanized rubber having a thickness of approximately 0.6 to 1.2 mm.

5. A tire patch as defined in claim 1, in which said superimposed reinforcing members are covered on both sides by cushioning disks of unvulcanized rubber of a thickness of approximately 0.4 to 0.6 mm.

6. A tire patch as defined in claim 1, in which each of said reinforcing members substantially consists of two directly superimposed rubberized fabric strips, one of said fabric strips of each member being of a smaller size in both directions than the subjacent fabric strip.

7. A tire patch as defined in claim 1, in which the portions of the members projecting outwardly of said central area define tongues having outer rounded ends and the sum of the areas inside a circle circumscribing the outer rounded ends of said tongues said reinforcing members and between the adjacent sides of adjacent tongues is substantially equal to the sum of the areas of said tongues.

8. A tire patch as defined in claim 1 in which said reinforcing body is enveloped in rubber including rubber portions filling the space between said projecting portions of each member and further comprising a rubber body covering said enveloped body of reinforcing members at least at one side and consisting of at least partly vulcanized rubber.

9. A tire patch as defined in claim 1, in which each of said reinforcing members substantially consists of a woven rubberized fabric of pretensioned synthetic warp and weft fibers.

10. A tire patch as defined in claim 1, in which each of said reinforcing members substantially consists of a rubberized fabric having a reduced and substantially preset degree of elasticity.

11. A tire patch as defined in claim 10, in which said reinforcing members have their elasticity reduced and preset by a heat treatment.

12. A tire patch as defined in claim 1, in which the reinforced center of the patch formed by said overlapped portions of the members is provided with a marking.

13. A tire patch as defined in claim 12, in which said marking is made of a size substantially in accordance with the maximum size of the defect to be repaired by the patch.

14. A tire repair patch comprising a plurality of woven rubberized fabric reinforcing members arranged in angularly displaced, superimposed relation, said members having a thickness of from 0.3 to 0.8 mm. and including warp and weft threads of substantially equal tensile strength of synthetic thermosettable fibers woven at a temperature of at least approximately 150° C., said members having end portions projecting outwardly of the central overlapped area of the members whereby the thickness of the patch diminishes from its central area outwardly so that the rigidity of the patch gradually decreases radially outward from its center while its elasticity increases, said projecting end portions having rounded ends to define a reinforcing body of rosette-like shape, rubber material embedding and enveloping said members and filling the area between the individual projecting end portions of the members and said rubber material extending outwardly beyond the outer rounded ends of said projecting end portions of the members whereby tensile and tangential stresses arising during changes in load conditions exerted on the patch in use will be absorbed by said reinforcing body regardless of the direction of such stresses relative to the center of the patch.

15. In a tire patch, a plurality of superimposed reinforcing members each having rounded end portions, rubber material fully embedding said reinforcing members, said members being arranged in overlapping relation so that the end portions are at an angle to each other to define in plan a reinforcing body of rosette-like shape, said body having a central area including over-lapping portions of a plurality of the members and which central area is large in comparison to the radial extent of each member, said body further having a peripheral area including the end portions of the individual members, the projecting extent of said end portions outwards of the central area being smaller than the transverse extent of said central area, each member consisting of rubberized fabric having a thickness of between 0.3 to 0.8 mm. whereby said central area is thin, and each member including warp and weft strands of thermosettable fiber woven at a temperature of at least approximately 150° C., each member having a tensile strength both in the warp and weft directions of the fabric of approximately 165 kg. so as to be capable of absorbing tensile stresses exerted either radially or tangentially of the patch when the same is in use on a tire.

16. A tire repair patch comprising a plurality of woven rubberized fabric reinforcing members aranged in angularly displaced, super-imposed relation, said members having a thickness of from 0.3 to 0.8 mm. and including warp and weft threads of synthetic thermosettable fibers woven at a temperature of at least approximately 150° C., said warp and weft threads having a tensile strength of approximately 165 kg., said members having end portions projecting outwardly of the central overlapped area of the members whereby the thickness of the patch diminishes from its central area outwardly so that the rigidity of the patch gradually decreases radially outward from its center while its elasticity increases, said projecting end portions having rounded ends to define a reinforcing body of rosette-like shape, rubber material embedding and enveloping said members and filling the area between the individual projecting end portions of the members and said rubber material extending outwardly beyond the outer rounded ends of said projecting end portions of the members whereby tensile and tangential stresses arising during changes in load conditions exerted on the patch in use will be absorbed by said reinforcing body regardless of the direction of such stresses relative to the center of the patch.

References Cited in the file of this patent
UNITED STATES PATENTS

| | | |
|---|---|---|
| 1,339,696 | Duffy | May 11, 1920 |
| 1,385,805 | Voorhees | July 26, 1921 |
| 2,041,988 | Wilson | May 26, 1936 |
| 2,756,800 | Riggs | July 31, 1956 |

FOREIGN PATENTS

| | | |
|---|---|---|
| 648,929 | France | Aug. 21, 1928 |

OTHER REFERENCES

"Fresh-Run," January 1949, vol. 7, No. 1, published by Camelback Div. Gates Rubber Co., Denver, Colorado, 4 pages (pages 1, 2 and 4 relied upon).

German Application, 1,003,064, printed Feb. 21, 1957 (Kl 63e 18/03).

German Application, 1,016,146, printed Sept. 19, 1957 (Kl 63e 18/03).